(12) United States Patent
Ignatz-Hoover

(10) Patent No.: US 6,207,764 B1
(45) Date of Patent: Mar. 27, 2001

(54) HALOGENATED ELASTOMER COMPOSITIONS

(75) Inventor: Frederick Ignatz-Hoover, Elyria, OH (US)

(73) Assignee: Monsanto Company, St. Louis, MO (US)

( * ) Notice: Subject to any disclaimer, the term of this patent is extended or adjusted under 35 U.S.C. 154(b) by 0 days.

(21) Appl. No.: 08/428,994

(22) Filed: Apr. 26, 1995

(51) Int. Cl.[7] .......................... C08C 19/20; C08C 19/26; C08F 8/00
(52) U.S. Cl. ..................... 525/332.6; 525/332.7; 525/351
(58) Field of Search .............................. 525/332.6, 332.7, 525/333.5

(56) References Cited

U.S. PATENT DOCUMENTS

| | | |
|---|---|---|
| 4,417,012 | 11/1983 | Moniotte . |
| 4,704,334 * | 11/1987 | Delseth ................................. 524/83 |
| 5,162,445 | 11/1992 | Powers et al. .................... 525/333.4 |
| 5,373,062 | 12/1994 | Gardner et al. .................. 525/333.4 |

* cited by examiner

Primary Examiner—Christopher Henderson
(74) Attorney, Agent, or Firm—Louis A. Morris

(57) ABSTRACT

Rubber compositions in which the rubber is a halogenated butyl elastomer are crosslinkable by virtue of containing a crosslinking agent such as zinc oxide and an accelerator which is a salt of an organic thiosulfate.

24 Claims, No Drawings

HALOGENATED ELASTOMER COMPOSITIONS

FIELD OF THE INVENTION

The present invention relates to compositions containing halogenated elastomers, particularly elastomeric interpolymers containing isobutylene and para haloalkyl-substituted styrene, crosslinking agents and thiosulfate accelerators.

BACKGROUND OF THE INVENTION

Halogenated copolymers of isobutylene and up to about 4 mole % of isoprene (butyl rubber) are well known polymeric materials whose vulcanizates offer some outstanding properties not possessed by many other diolefin based elastomers. Articles prepared from many cured halogenated elastomers offer improved resistance to oils and greases as well as resistance to oxygen and ozone degradation. Butyl rubber vulcanizates exhibit good abrasion resistance, excellent impermeability to air, water vapor, and many organic solvents, as well as resistance to aging and sunlight. These properties render these materials ideal candidates for one or more applications such as water hoses, organic fluid hoses, components in tire construction, gaskets, adhesive compositions and various molded articles.

More recently, new halogenated elastomeric interpolymers have been discovered which offer many of the same properties as halogenated butyl rubber, but are even more ozone and solvent resistant and are more readily curable. These materials are the halogenation product of random copolymers of a $C_4$ to $C_7$ isoolefin, such as isobutylene, and a para-alkyl styrene comonomer wherein at least some of the alkyl substituent groups present in the styrene monomer units contain halogen.

These copolymers and their method of preparation are more particularly disclosed in U. S. Pat. No. 5,162,445, the complete disclosure of which is incorporated herein by reference.

The aromatic halomethyl groups present in such copolymers permit facile crosslinking to be accomplished in a variety of ways, including by means of zinc oxide or promoted zinc oxide curing systems normally used to cure halogenated butyl rubber.

Some of these promoted zinc oxide crosslinking systems, however, give serious precure problems.

U. S. Pat. No. 5,373,062 discloses halogenated elastomer compositions featuring a promoted zinc oxide crosslinking agent and a bismuth carboxylate scorch inhibitor.

It is an object of this invention to provide halogenated elastomer compositions which cure quickly, but without serious precure problems, and achieve a high level of crosslinking.

SUMMARY OF THE INVENTION

In accordance with the present invention, an improved promoted curing system for halogenated elastomers has been discovered wherein the curing system contains a crosslinking agent and an accelerator material containing one or more groups of the formula

—S—SO$_2$—OM attached to a hydrocarbon radical, an organic bridging group or a polymer, and M is a monovalent metal, the equivalent of a multivalent metal, a monovalent ion derived by the addition of a proton to a nitrogenous base or the equivalent of a multivalent ion derived by the addition of two or more protons to a nitrogenous base.

Halogenated elastomer compositions containing these crosslinking agents and accelerator materials cure quickly to a high state of cure, and avoid problems of precure.

DETAILED DESCRIPTION OF THE INVENTION

The halogenated elastomer present in the compositions of this invention include chlorinated or brominated butyl rubber, chlorinated or brominated interpolymers of a $C_4$ to $C_7$ isolefin and a para-alkyl styrene, mixtures thereof or mixtures of one or both of these elastomers with vulcanizable diene elastomers such as natural or synthetic cis-polyisoprene, polybutadiene, butadiene-styrene copolymers or elastomeric copolymers of ethylene, propylene and up to 10 mole % of a non-conjugated diene (known as EPDM rubber).

The halobutyl rubbers can be based on chlorinated or brominated copolymers of isobutylene with up to about 4 mole % of isoprene. These elastomers generally have a number average molecular weight within the range of about 50,000 up to about 500,000 and may be prepared by polymerization and halogenation methods well known in the art such as disclosed in U.S. Pat. Nos. 2,940,960 and 3,099,644, the disclosures of which are incorporated herein by reference.

Halogenated interpolymers based on a $C_4$ to $C_7$ isoolefin, such as isobutylene, and a para-alkylstyrene, such as para-methylstyrene, are also now known in the art as evidenced by the aforementioned U.S. Pat. No. 5,162,445.

More preferred materials are the halogenation product of a random copolymer of a $C_4$ to $C_7$ isoolefin, such as isobutylene, and a para-alkylstyrene comonomer wherein at least some of the alkyl substituent groups present in the styrene monomer units contain halogen. Preferred materials may be characterized as isobutylene interpolymers containing the following monomer units randomly spaced along the polymer chains:

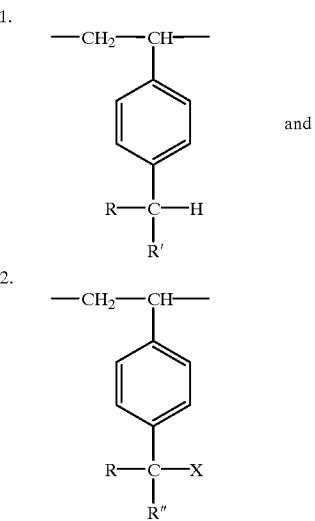

wherein at least about 5 mole % of the comonomer units present in the polymer chain are of the structure of formula 2, R and R' are independently hydrogen or $C_1$ to $C_4$ alkyl, R" is independently hydrogen, $C_1$ to $C_4$ alkyl or X, and X is bromine or chlorine, and wherein the interpolymer is otherwise substantially free of any halogen in the polymer backbone chain.

With reference to isobutylene as the isoolefin comonomer, these interpolymers are inclusive of:

a) copolymers consisting of isobutylene and a monomer having the structure of formula 2 wherein R" is hydrogen or $C_1$ to $C_4$ alkyl, e.g., copolymers of isobutylene and a monohalo-substituted para-alkylstyrene;

b) terpolymers comprising isobutylene and a mixture of monomers having the structure of formulas 1 and 2 wherein R" is hydrogen or $C_1$ to $C_4$ alkyl, e.g., terpolymers of isobutylene, a para-alkylstyrene and a monohalo-substituted para-alkylstyrene;

c) terpolymers comprising isobutylene and a mixture of monomers having the structure of formula 2 wherein, with respect to a major proportion of the formula 2 monomer, R" is hydrogen or $C_1$ to $C_4$ alkyl and, with respect to a minor proportion of said formula 2 monomer, R" is bromine or chlorine, e.g., terpolymers of isobutylene, a mono-halo substituted para-alkylstyrene and a di-halo substituted para-alkylstyrene; and d) tetrapolymers comprising isobutylene and a mixture of monomers having the structure of formulas 1 and 2 wherein, with respect to major proportion of the formula 2 monomer, R" is hydrogen or $C_1$ to $C_4$ alkyl and, with respect to a minor proportion of said formula 2 monomer, R" is bromine or chlorine, e.g., tetrapolymers of isobutylene, a para-alkylstyrene, a monohalo-substituted para-alkylstyrene and a dihalo-substituted para-alkylstyrene.

As stated above, these halogenated interpolymers are prepared using a copolymer of a $C_4$ to $C_7$ isoolefin and a para-alkylstyrene as the halogenation substrate. Interpolymers having the composition (a), (b), (c) or (d) above will be produced as a function of the severity of the halogenation reaction. For example, mild halogenation will tend to yield interpolymers of the characteristics of (b), stronger halogenation will yield interpolymers of the characteristics of (a) or (d) and the strongest halogenation will yield terpolymers having the characteristics of (c).

The most preferred elastomers used in the compositions of the present invention are random elastomeric brominated terpolymers comprising isobutylene and para-methylstyrene (PMS) containing from about 0.5 to about 20 mole % PMS, more preferably from about 2 to about 15 mole % PMS, wherein up to about 60 mole % of the PMS monomer units contain a mono-bromomethyl group. These elastomeric copolymers generally exhibit a number average molecular weight in the range of from about 50,000 to about 250,000, more preferably from about 80,000 to about 180,000. From about 5 up to about 60 mole % of the total PMS monomer content of the terpolymer contains a mono-bromomethyl group with essentially no bromination occurring in the polymer backbone or in the aromatic ring. The bromine content of these terpolymers generally ranges from about 0.1 to about 5 mole %.

An advantage of elastomer compositions containing halogenated butyl rubber, or particularly, halogenated isobutylene-PMS interpolymers is that they may be more readily covulcanized with other general purpose elastomers such as polybutadiene, natural rubber, and the like as well as EPDM elastomers. This characteristic is due primarily to the fact that these halogenated materials can be made to co-cure with more highly unsaturated rubber by mechanisms which are independent of the sulfur and promoted sulfur systems used to cure the more highly unsaturated elastomers.

Illustrative of known curing agents or accelerators which can be used alone or in conjunction with zinc oxide for curing halogenated elastomers are brominated alkyl phenol resin; N,N'-diethylthiourea; di-ortho-(tolyl)guanidine salt of dicatechol borate; dipentamethylene thiuram tetrasulfide; ethylene trithiocarbamate; 2-mercaptobenzothiazole; alkyl or aryl benzothiazole disulfides, tetramethylthiuram disulfide, zinc diethyldithiocarbamate, zinc dibutyldithiocarbamate, and zinc dimethyldithiocarbamate. A known cure system comprises zinc oxide and dipentamethylene thiuram tetrasulfide. Preferred in the compositions of the invention is zinc oxide alone, in a preferred amount of from 0.05 to 10 parts, more preferably 0.1 to 5 parts and most preferably 2 to 3 parts by weight per 100 parts of the halogenated elastomer by weight.

Preferred accelerator materials are compounds in which the thiosulfate groups are each linked to a primary carbon atom of the hydrocarbon radical or bridging group, and polymers in which thiosulfate groups are linked to primary carbon atoms in side chains attached to the main polymer chain. The thiosulfate groups therefore usually occur in the form —$CH_2$—S—$SO_2$—OM.

Accelerators which are compounds in which a single —S—$SO_2$—OM group is attached to a hydrocarbon radical include alkyl or aryl thiosulfates—sometimes called "Bunte salts." Illustrative of these compounds are ethylthiosulfate salts, benzylthiosulfate salts and the like. The hydrocarbon radical can be alkyl of 1–20 carbon atoms, aryl of 6–20 carbon atoms or aralkyl or alkaryl of 7–21 carbon atoms. Other, non-reactive, substituents can be present on the hydrocarbon radicals.

Accelerators which are compounds containing groups of the formula —S—$SO_2$—OM linked by an organic bridging group normally contain two, three or four groups —S—$SO_2$—OM. Illustrative of such compounds are those having the formula

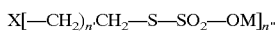

where n' has an integral value of at least 1, n" has the value 2, 3 or 4 and X represents the remainder of the bridging group.

In compounds having two groups

the bridging group is divalent, and such compounds can be represented by the formula

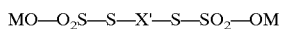

In this formula X' can be, for example, a straight- or branched-chain alkylene or alkenylene group, preferably one containing from 2 to 40 carbon atoms, and more preferably one containing 5 to 16 carbon atoms. Examples of such groups are ethylene, pentamethylene, hexamethylene, octamethylene, nonamethylene, decamethylene, dodecamethylene, 3-methyl-1,5-pentylene and 1,6-hex-2-enylene. As a variant, a divalent bridging group may be an alkylene or alkenylene group having one or more aryl, for example phenyl, substituents. An example of such a radical is 2-phenyl-1,4-butylene.

In other instances, X' has a structure comprising two or more alkylene units, pairs of such units being linked through an oxygen or sulfur atom, through a group —$SO_2$—, —$NH_2$+—, —$N(C_{1-6}alkyl)$- or —COO—, or through an arylene or cycloalkylene radical. Representative of such structures are those of the formula

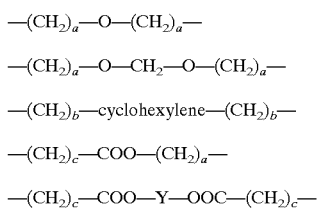

each a and each c independently represents an integer of from 2 to 20, each b independently represents an integer of from 1 to 10, and Y represents a group —$(CH_2)_c$— or a group —(CH$_2$CH$_2$O)$_d$CH$_2$CH$_2$— where d represents an integer of from 1 to 5. Preferred values for a are from 3 to 8, preferred values for b are 1 to 4, and preferred values for c are from 3 to 18, more especially 3 to 12.

Other examples of the bridging group X' are those having the formula

—(CH$_2$)$_c$—SO$_2$—(CH$_2$)$_c$—

—(CH$_2$)$_c$—NH—(CH$_2$)$_c$— and

—(CH$_2$)$_c$—NH$_2$+—(CH$_2$)$_c$— where each c independently has a value from 2 to 20, preferably from 3 to 18, and more preferably from 3 to 12.

Where values of a, b or c exceed 2, the polymethylene groups can be straight chain or branched, but preferably the terminal carbon atom to which the —SO$_2$—OM group is attached is a primary carbon atom.

Accelerator compounds having three or four thiosulfate groups include those where three or four groups —CH$_m$H$_{2m}$—S—SO$_2$—OM, m typically having a value from 3 to 6, are substituents in an aromatic nucleus, for example a benzene or naphthalene nucleus, (which may also contain other substituents), or as substituents in one or more nuclei of a di- or trinuclear aromatic compound, for example biphenyl, diphenyl ether, diphenyl sulphone or benzophenone.

Further examples of trivalent bridging groups are those of the formula

—A$^1$—OCH$_2$CH(OA$^1$—)CH$_2$OA$^1$— and

A—C(AOOCA$^1$—)$_3$ where each A$^1$ is independently an alkylene group, for example a C$_{2-18}$, preferably a C$_{3-12}$, alkylene group and A is C$_{1-16}$ alkyl;
and also those of the formula N[CH$_2$—$_c$]$_3$ and HN+[(CH$_2$—$_c$]$_3$ where each c independently has a value from 2 to 20, preferably from 3 to 18, more especially from 3 to 12.

Further examples of tetravalent bridging groups are those having the formula

C(A$^1$)$_4$ and (A$^1$)$_3$Si—O—Si(A$^1$)$_3$ where A$^1$ has the same meaning as before; and those having the formula C[CH$_2$OCO(CH$_2$)—$_c$]$_4$ where each c independently has a value from 2 to 20, preferably from 3 to 18 and more preferably from 3 to 12.

Examples of polymers are those of the formula

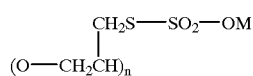

and esterified and partially esterified polyvinyl alcohols wherein the polymer chain is formed from units selected from

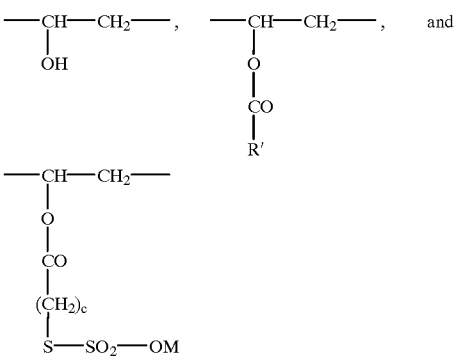

where R' represents a C$_{1-12}$alkyl group and c has an integral value of from 2 to 20, and at least 10%, preferably at least 20%, for example from 25% to 75%, of the units in the polymer are those containing the group —S—SO$_2$—OM.

When M in the above formula of the accelerator material represents a monovalent metal, this can be for instance an alkali metal, for example sodium, lithium or potassium. Sodium is the preferred alkali metal. M can alternatively represent the equivalent of a multivalent metal, for instance magnesium, calcum, barium, zinc, nickel, cobalt or aluminium.

Where M represents a monovalent ion formed by the addition of a proton to a nitrogenous base, the nitrogenous base can be ammonia or a simple primary, secondary or tertiary amine R$^2$NH$_2$, R$^2$R$^3$NH or R$^2$R$^3$R$^4$N where each of R$^2$, R$^3$ and R$^4$ independently represents an alkyl group, for example a C$_{1-20}$ alkyl group, a C$_{5-9}$ cycloalkyl or alkylcycloalkyl group, for example cyclohexyl or methylcyclohexyl, a benzyl group, a phenyl group or a substituted phenyl group, for example a tolyl or chlorophenyl group, provided that not more than one of R$^2$, R$^3$, and R$^4$ is a phenyl or substituted phenyl group.

Preferred amines are those that are relatively weakly basic. These include amines where weak basicity is a result of steric hindrance around the nitrogen atom due, for example, to the presence of a tert-alkyl group, for instance a tert-alkyl group having from 4 to 12 carbon atoms, such as tert-butyl, tert-amyl or 1,1,3,3-tetramethylbutyl. Examples of such amines are the secondary amines R$^2$R$^3$NH where one of R$^2$ and R$^3$ is a tert-alkyl group and the other is a benzyl group or a cyclohexyl or alkylcycloalkyl group. Alternatively, both R$^2$ and R$^3$ can be tert-alkyl groups. Further examples are tertiary amines where R$^2$ is a tert alkyl group and R$^3$ and R$^4$ are benzyl groups.

Other suitable weakly basic amines are the primary amines, R$^2$NH$_2$, where R$^2$ is a phenyl or substituted phenyl group, and the secondary amines, R$^2$R$^3$NH, where R$^2$ is a phenyl or substituted phenyl group and R$^3$ is a C$_{1-12}$ alkyl group. Examples of such amines are aniline, the toluidines, N-methylaniline, N-butylaniline and N-isohexylaniline. A special class of such secondary amines comprises those where R$^2$ represent a secondary alkyl group, preferably a C$_{3-12}$ secondary alkyl group, or a cyclohexyl group, and R$^3$ represents a 4-phenylaminophenylene group. These amines include compounds such as N-isopropyl-N'-phenyl-p-phenylenediamine, N-sec-butyl-N'-phenyl-p-phenylenediamine, N-1,3-dimethylbutyl-N'-phenyl-p-phenylenediamine, N-1,4-dimethylpentyl-N'-phenyl-p-phenylenediamine and N-cyclohexyl-N'-phenyl-p-phenylenediamine. Such amines function as mono-acid bases despite the presence of the second nitrogen atom in the 4-phenylaminophenylene group, because this second nitrogen atom has virtually no basicity.

Other examples of nitrogenous bases which form thiosulfate salts of the invention are guanidine and substituted guanidines, for example those of the formula

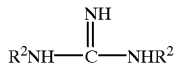

and substituted isothioureas, for example those of the formula

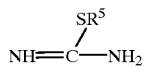

where each $R^2$ independently represents hydrogen, an alkyl group, for example a $C_{1-20}$ alkyl group, a $C_{5-9}$ cycloalkyl or alkylcycloalkyl group, a benzyl group, a phenyl group or a substituted phenyl group; for instance a tolyl group, and $R^5$ represents a $C_{1-20}$ group, a $C_{5-9}$ cycloalkyl or alkylcycloalkyl group or a benzyl group. Specific examples of substituted guanidines are diphenylguanidine and di-o-tolylguanidine; specific examples of substituted isothioureas are S-ethylisothiourea and S-benzylisothiourea.

Where M represents an equivalent of a multivalent cation formed by the addition of two or more protons to a nitrogenous base, the bases from which such ions can be derived include alkylene diamines, N,N'-disubstituted alkylene diamines, phenylenediamines and N,N'-disubstituted phenylenediamines of the formula $$R^2NH—A—NHR^2$$

where A represents an alkylene radical —$(CH_2)$— where c has a value of from 2 to 20, preferably from 2 to 12, and which may be straight chain or branched, or a phenylene, for example a meta- or para-phenylene radical, and each $R^2$ independently represents an alkyl group, for example a $C_{1-20}$ alkyl group, a $C_{5-9}$ cycloalkyl or alkylcycloalkyl group, a benzyl group, a phenyl group or substituted phenyl group, provided that neither $R^2$ is a phenyl or substituted phenyl group when A is a phenylene radical.

In preferred amines where A represents an alkylene radical, $R^2$ is a tert-alkyl group, for example tert-butyl, t-amyl or 1,1,3,3-tetramethylbutyl, or a phenyl group. Examples of such amines are N,N'-diphenylethylene diamine, N,N'-di-tert-butyl-1,4-tetramethylene diamine and N,N'-bis(1,1,3,3-tetramethylbutyl)-1,6-hexamethylene diamine.

In preferred amines where A represents a phenylene radical, $R^2$ is a secondary alkyl group, preferably a $C_{3-12}$ secondary alkyl group or a cyclohexyl group. Examples of such amines are N,N'-di-sec-butyl-p-phenylenediamine, N,N'-bis(1,3-dimethylbutyl)-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine and N,N'-dicyclohexyl-p-phenylenediamine.

Possible bases also include polyalkylene polyamines of the formula $$R^2NH—(A'—NH)_n—A'NHR^2$$

where A' represents an alkylene radical of from 2 to 8 carbon atoms, n has a value of from 1 to 5, and each $R^2$ independently represents a $C_{1-20}$ alkyl group, a $C_{5-9}$ cycloalkyl or alkylcycloalkyl group, a benzyl group, a phenyl group or a substituted phenyl group.

In other instances, the nitrogen of the nitrogenous base is part of a heterocyclic ring. The base can be monocyclic, for example pyridine, or a compound in which the nitrogen-containing heterocyclic ring is fused to another ring, as for example quinoline. Moreover, the heterocyclic ring can be saturated, as for example in morpholine or piperidine, or it may contain one or more double bonds, as for example in pyrroline or 1,2-dihydroquinoline.

Of the compounds where M represents such a base, those preferred for use as accelerators are compounds where M represents a 1,2-dihydroquinolinium ion, which may optionally have ring substituents. Examples of such ions are 2,2,4-trimethyl-1,2-dihydroquinolinium, 2,2,4-trimethyl-6-($C_{1-12}$ alkoxy)-1,2-dihydroquinolinium, for instance 2,2,4-trimethyl-6-ethoxy-1,2-dihydro-quinolinium, 2,2,4-trimethyl-6-($C_{1-8}$ alkyl)-1,2-dihydro-quinolinium, for instance 2,2,4-trimethyl-6-dodecyl-1,2-dihydroquinolinium, and 2,4-diethyl-2-methyl-1,2-dihydroquinolinium.

Other classes of bases which form divalent cations by the addition of two protons are represented by the general formula

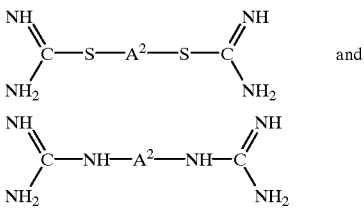

where $A^2$ represents a radical —$(CH_2)_c$—, where c is an integer from 2 to 20, preferably from 3 to 12, and the radical —$(CH_2)_c$— can be either straight chain or branched or a $C_{2-20}$ alkenylene or alkadienylene radical, for example a but-2-enylene or octa-2,6-dienylene radical. These bases form bis(isothiouronium) and bis(-guanidinium) ions respectively.

The accelerators of the invention are disclosed and claimed in U.S. Pat. Nos. 4,417,012, 4,520,154 and 4,587,296. The use described in these patents for the materials is as "stabilizers" for vulcanized diene rubber, providing resistance to reversion on extended anaerobic aging.

The compositions of this invention may also contain a blend of the halogenated elastomers with vulcanizable diene elastomers such as natural or synthetic cis-polyisoprene, polybutadiene, copolymers of butadiene with styrene EPDM elastomers and like materials. Such blends may contain from about 10 to about 90% by weight of each type of elastomer.

The vulcanizable composition may also contain other conventional additives known in the art, including fillers such as carbon black or silica, stabilizers, antioxidants, plasticizers, processing oils and like additives as are known in the art.

The vulcanizable composition may be prepared and blended using any suitable mixing device such as a two-roll mill, an internal mixer (Brabender Plasticorder), a Banbury Mixer, a kneader or a similar mixing device. Blending temperatures and times may range about 15° to 180° C. and from about 4 to 10 minutes respectively. After forming a homogeneous mixture of the halogenated elastomer and the optional fillers, processing aids and the like, the mixture is then prepared for vulcanization by the further incorporation of the scorch retarder and curing system of this invention in the mixing device or on a separate mixing device such as a two roll mill, after which the mixture is sheeted out as is well known in the art.

A more complete understanding of the invention may be obtained by reference to the following examples, in which all parts are by weight and all temperatures in degree celsius, unless otherwise specified.

EXAMPLE 1

A masterbatch of the preferred elastomer of the invention was first prepared, using the following proportions:

| Material | Parts by Weight |
|---|---|
| Exxpro 89-4 | 100.0 |
| N-660 Carbon Black | 60.0 |
| Stearic Acid | 1.0 |

Exxpro 89-4 is a brominated copolymer of 95% of isobutylene and 5% p-methylstyrene, with a Mooney viscosity of about 40 (ML 1+8 @ 125° C.) manufactured by Exxon Chemical Company.

The masterbatch was produced on a laboratory Banbury mixer, mixing the rubber alone for 1.0 minute, adding two thirds of the stearic acid and black and mixing to 110° C. Then, the rest of the black and stearic acid was added and mixed 1.0 minute. The batch was dumped at 121° C.

Portions of the masterbatch were then further compounded on a mixing mill, adding zinc oxide and accelerator. The proportions are set forth in Table I, together with test results on the compounds run according to ASTM standard test methods MBTS is a vulcanization accelerator, benzothiazyl disulfide. DURALINK® HTS is a registered trademark for hexamethylene bis-thiosulfate, sodium salt dihydrate, sold by Monsanto Company.

The test results in Table I show that a much faster rate of crosslinking is obtained with DURALINK® HTS, as evidenced by the much shorter $t_{90}$ times, and the much higher peak rate. Further, DURALINK® HTS gives a much high degree of crosslinking, as shown by the much higher ultimate tensile and modulus figures.

EXAMPLE 2

This is a comparative example, showing crosslinking of the preferred halogenated rubber using several known accelerators of vulcanization. MBT is 2-mercaptobenzothiazole; MBTS is as described in Example 1, TBBS is t-butylbenzothiazole sulfenamide, and TBSI is t-butylbenzothiazole sulfenimide. The masterbatch is the same one shown in Example 1.

Proportions used and test results obtained are shown in Table II. It is clear from the test results that none of the known accelerators tested gave results comparable to DURALINK® HTS. Moreover, in many instances, increased levels of accelerator produced lower modulus and lower maximum rheometer torque.

TABLE I

| Material | 1 | 2 | 3 | 4 | 5 |
|---|---|---|---|---|---|
| Masterbatch | 161.0 | 161.0 | 161. | 161.0 | 161.0 |
| Zinc Oxide | 3.22 | 3.22 | 3.22 | 3.22 | 3.22 |
| MBTS | — | 0.55 | 1.10 | — | — |
| DURALINK ® HTS | — | — | — | 0.55 | 1.10 |
| Curemeter Results: | | | | | |
| MDR 2000 @ 180° C. | | | | | |
| Rmax, dNm | 20.8 | 18.1 | 15.0 | 20.9 | 20.2 |
| $t_{10}$, min. | 3.6 | 4.1 | 2.8 | 1.1 | 1.1 |
| $t_{25}$. min. | 11.2 | 6.0 | 4.3 | 2.2 | 2.1 |
| $t_{90}$, min. | 38.5 | 32.3 | 35.9 | 19.3 | 7.6 |
| Peak rate, dNm/min. | 1.0 | 1.7 | 2.3 | 3.5 | 9.3 |
| Tensile Properties: | | | | | |
| Ultimate Tensile, MPa | 9.6 | 15.7 | 14.6 | 16.6 | 17.0 |
| Ultimate Elongation, % | 421 | 326 | 488 | 222 | 220 |
| 100% Modulus, MPa | 2.2 | 3.5 | 2.7 | 6.1 | 6.6 |

TABLE II

| Material | 6 | 7 | 8 | 9 | 10 | 11 | 12 | 13 | 14 |
|---|---|---|---|---|---|---|---|---|---|
| Masterbatch | 161.0 | 161.0 | 161.0 | 161.0 | 161.0 | 161.0 | 161.0 | 161.0 | 161.0 |
| Zinc Oxide | 2.0 | 2.0 | 2.0 | 2.0 | 2.0 | 2.0 | 2.0 | 2.0 | 2.0 |
| MBT | — | 0.23 | 0.46 | — | — | — | — | — | — |
| MBTS | — | — | — | 0.46 | 0.91 | — | — | — | — |
| TBBS | — | — | — | — | — | 0.33 | 0.66 | — | — |
| TBSI | — | — | — | — | — | — | — | 0.56 | 1.11 |
| Curemeter Results: | | | | | | | | | |
| MDR 2000 @ 180° C. | | | | | | | | | |
| Rmax, dNm | 16.0 | 14.5 | 13.2 | 15.0 | 13.8 | 13.9 | 12.1 | 14.7 | 12.9 |
| $t_{10}$, min. | 4.2 | 3.7 | 2.9 | 4.7 | 3.9 | 3.2 | 2.2 | 4.8 | 3.9 |
| $t_{25}$, min. | 14.8 | 7.8 | 5.0 | 8.2 | 5.5 | 6.3 | 4.1 | 8.8 | 6.3 |
| $t_{90}$, min. | 37.4 | 32.4 | 34.4 | 32.3 | 34.3 | 26.9 | 17.5 | 30.2 | 25.4 |
| Peak rate, dNm/min. | 0.8 | 1.1 | 1.1 | 1.2 | 1.7 | 0.7 | 1.0 | 0.9 | 1.1 |
| Tensile Properties | | | | | | | | | |
| Ultimate Tensile, MPa | 12.5 | 13.0 | 12.1 | 14.1 | 14.3 | 12.5 | 13.3 | 12.7 | 12.9 |
| Ultimate Elongation, % | 131 | 148 | 158 | 156 | 185 | 159 | 216 | 159 | 190 |
| 100% Modulus, MPa | 8.5 | 7.3 | 6.3 | 7.8 | 6.3 | 6.3 | 4.4 | 6.5 | 5.1 |

EXAMPLE 3

In a manner similar to that of Example 1, rubber compositions containing a mono-Bunte salt accelerator were prepared and tested.

The same ingredients, in the same proportions, were present in the masterbatch except that Exxpro 90-10 was used, as described in Example 4 below. Lower levels of zinc oxide were used, compared with Example 1, and control samples containing no accelerator and containing DURALINK® HTS were compared. Proportions and test results are set forth in Table III.

The results demonstrate the effectiveness of mono-Bunte salts as accelerators in the composition of the invention.

EXAMPLE 4

In order to show the use of blends of diene hydrocarbon rubber with the halogenated elastomers in the compositions of the invention, another series of samples was made and tested, in a similar manner.

The masterbatch for the blend had the following proportions:

| Material | Parts by Weight |
|---|---|
| Exxpro 90-10 | 40.0 |
| Polybutadiene | 50.0 |
| Natural Rubber | 10.0 |
| N-660 Carbon Black | 50.0 |
| Naphthenic Oil | 12.0 |
| Tackifying Resin | 5.0 |
| Mixing Aid | 4.0 |
| Total | 171.0 |

Exxpro 90-10 is a brominated copolymer of 92.5% isobutylene and 7.5% p-methylstyrene, with a Mooney Viscosity of about 45 (ML 1+8 @ 125° C.). The polybutadiene was a 98% cis 1,4-homopolymer from 1,3-butadiene. The mixing aid was Struktol® 40MS, and the tackifying resin was Escorez® 1102, manufactured by Exxon Chemical Company.

Proportions of compound ingredients and test results are shown in Table IV. Zinc ethylhexanoate, a fatty-acid zinc salt, was also compared as a cure-activator.

Results show that the composition containing DURALINK® HTS was much faster in the early stages of cure, as indicated by the $t_{10}$ and $t_{25}$ times; while the final properties of all samples were comparable, the DURALINK® HTS sample reached these properties much more quickly.

TABLE III

| Material | 15 | 16 | 17 | 18 | 19 |
|---|---|---|---|---|---|
| Masterbatch | 161.0 | 161.0 | 161.0 | 161.0 | 161.0 |
| Zinc Oxide | 1.0 | 0.5 | 1.0 | 0.5 | 1.0 |
| DURALINK ® HTS | — | 0.5 | 0.5 | — | — |
| NaBenzyl Thiosulfate | — | — | — | 0.63 | 0.63 |
| Curemeter Results: | | | | | |
| MDR 2000 @ 180° C. | | | | | |
| R Max, dNm | 30.8 | 25.7 | 30.7 | 24.9 | 28.6 |
| $t_{10}$, min. | 2.6 | 2.8 | 2.1 | 2.1 | 1.5 |
| $t_{25}$, min. | 3.8 | 4.2 | 2.7 | 3.0 | 2.2 |
| $t_{90}$, min. | 15.4 | 32.1 | 14.6 | 33.5 | 15.5 |
| Peak rate, dNm/min. | 4.0 | 4.8 | 9.7 | 4.8 | 7.8 |
| Tensile Properties: | | | | | |
| Ultimate Tensile, MPa | 15.1 | 16.3 | 16.6 | 16.0 | 15.2 |
| Ultimate Elongation, % | 142 | 185 | 129 | 174 | 133 |
| 100% Modulus, MPa | 10.2 | 9.1 | 11.9 | 9.3 | 10.6 |

TABLE IV

| Material | 20 | 21 | 22 |
|---|---|---|---|
| Masterbatch | 171.0 | 171.0 | 171.0 |
| Zinc Oxide | 2.0 | 2.0 | 2.0 |
| TBBS | 2.0 | 2.0 | 2.0 |
| DURALINK ® HTS | — | — | 3.2 |
| Sulfur | 0.8 | 0.8 | 0.8 |
| Zinc Ethyl Hexanoate | — | 2.9 | — |
| Curemeter Results: | | | |
| ODR 2000 @ 160° C. | | | |
| Rmax, dNm | 34.1 | 37.0 | 30.4 |
| $t_{10}$, min. | 12.0 | 11.9 | 5.6 |
| $t_{25}$, min. | 17.2 | 16.8 | 6.7 |
| $t_{90}$, min. | 25.9 | 24.2 | 17.3 |
| Peak rate, dNm/min. | 3.6 | 4.6 | 4.6 |
| Tensile Properties: | | | |
| Ultimate Tensile, MPa | 13.9 | 12.7 | 14.1 |
| Ultimate Elongation, % | 622 | 611 | 684 |
| 100% Modulus, MPa | 1.68 | 1.4 | 1.4 |

What is claimed is:

1. A crosslinkable composition comprising a mixture of a halogenated elastomer selected from chlorinated or brominated interpolymers of a $C_4$ to $C_7$ isoolefin and a para-alkylstyrene comonomer, a crosslinking agent and from 0.1 to 10.0 parts by weight, per 100 parts of the halogenated elastomer by weight, of an accelerator compounds containing one or more groups of the formula

—S—SO₂—OM attached to a hydrocarbon radical or to an organic bridging group wherein M is a monovalent metal, the equivalent of a multivalent metal, a monovalent ion derived by the addition of a proton to a nitrogenous base, or the equivalent of a multivalent ion derived by the addition of two or more protons to a nitrogenous base.

2. A composition according to claim 1 wherein, in the accelerator compound, two or more groups —S—SO₂—OM are attached to a primary cation of a bridging group.

3. The composition of claim 1 wherein one or more vulcanizable diene elastomers, together with their curing systems, are blended therewith, in a weight ratio of 90:10 to 10:90.

4. A composition according to claim 2 wherein the accelerator material is a compound having the formula

MO—O₂S—S—X'—S—SO₂—OM where X' represents an alkylene radical or a radical comprising two or more alkyl units, pairs of such units being linked through an oxygen or sulfur atom, through a group —SO₂—, —NH—, —NH₂+—, —N(C₁₋₆alkyl)- or —COO—, or through an arylene or cycloalkylene radical.

5. A composition according to claim 4 wherein X' represents a $C_{2-16}$ alkylene radical or a radical having the formula —(CH₂)$_a$—O—(CH₂)$_a$—

—(CH₂)$_a$—O—CH₂—O—(CH₂)$_a$—

—(CH₂)$_b$-cyclohexylene-(CH₂)$_b$—

—(CH₂)$_c$—COO—(CH₂)$_a$—

—(CH₂)$_c$—COO—Y—OOC—(CH₂)$_c$—

—(CH₂)$_c$—SO₂—(CH₂)$_c$— or

—(CH₂)$_c$—NH₂+—(CH₂)$_c$— wherein each a independently represents an integer of from 3 to 8, b represents an integer of from 1 to 4, c represents an integer of from 3 to 12, Y represents a group —(CH₂)$_c$ or a group —(CH₂CH₂O)$_d$CH₂C—H₂— and d represents an integer of from 1 to 5.

6. A composition according to claim 5 in which each M represents an alkali metal or an equivalent of magnesium, calcium, barium, zinc, cobalt or nickel.

7. A composition according to claim 6 in which each M represents sodium.

8. A composition according to claim 5 in which each M represents an ammonium ion or an ion $$R^2NH_3+, R^2R^3NH_2+ \text{ or } R^2R^3R^4NH+$$

where each of $R^2$, $R^3$ and $R^4$ independently represents a $C_{1-20}$ alkyl group, a $C_{5-9}$ cycloalkyl or alkylcycloalkyl group, a benzyl group, a phenyl group or a substituted phenyl group, provided that not more than one of $R^2$, $R^3$ and $R^4$ is a phenyl or substituted phenyl group.

9. A composition according to claim 8 in which M represents an ion $R^2R^3NH+$ where one of $R^2$ and $R^3$ is a $C_{4-12}$ tert-alkyl group and the other is a benzyl group; or where one of $R^2$ is a $C_{3-12}$ sec-alkyl group or a cyclo-hexyl group and the other is a 4-phenylaminophenyl group.

10. A composition according to claim 5 in which M represents a guanidinium or substituted guanidinium ion of the formula $$R^2NH-\overset{\overset{NH_2+}{\|}}{C}-NHR^2$$

or a substituted isothiouronium ion of the formula $$+NH_2=\overset{\overset{SR^5}{/}}{C}-NH_2$$

where each $R^2$ independently represents hydrogen, a $C_{1-20}$ alkyl group, a $C_{5-9}$ cycloalkyl or alkylcycloalkyl group, a benzyl group, a phenyl group or a substituted phenyl group, and $R^5$ represents a $C_{1-20}$ alkyl group, a $C_{5-9}$ cycloalkyl or alkylcycloalkyl group or a benzyl group.

11. A composition according to claim 5 in which M represents an optionally ring-substituted 1,2-dihydroquinolinium ion.

12. A composition according to claim 5 in which M represents the equivalent of a divalent ion of the formula $$R^2N+H_2-A-N+H_2R_2$$

where A represents a radical $-(CH_2)_c-$ where c has a value from 2 to 20 or a phenylene radical, and each $R^2$ independently represents a $C_{1-20}$ alkyl group, a $C_{5-9}$ cycloalkyl or alkylcycloalkyl group, a benzyl group of a phenyl or substituted phenyl group, provided that neither $R^2$ is phenyl or substituted phenyl when A represents phenylene.

13. A composition according to claim 12 in which A represents a para-phenylene radical and each $R^2$ represents a $C_{3-12}$ sec-alkyl group.

14. A composition according to claim 5 in which M represents the equivalent of a divalent ion of the formula $$\underset{NH_2}{\overset{+NH_2}{\searrow}}C-S-(CH_2)_c-S-\underset{NH_2}{\overset{NH_2+}{\nearrow}}C \quad \text{or}$$

-continued $$\underset{NH_2}{\overset{+NH_2}{\searrow}}C-NH-(CH_2)_c-NH-\underset{NH_2}{\overset{NH_2+}{\nearrow}}C$$

where c is an integer from 2 to 20.

15. A composition according to claim 1 in which a single group $-S-SO_2-OM$ is attached to a monovalent hydrocarbon radical selected from 1–20 carbon alkyl, 6–20 carbon aryl radicals and 7–21 carbon aralkyl or alkaryl radicals.

16. The composition of claim 1, wherein the crosslinking agent is zinc oxide, present in an amount of from 0.05 to 10 parts by weight per 100 parts of the halogenated elastomer by weight.

17. The composition of claim 16, wherein the crosslinking agent and the accelerator material are present in an amount of from 0.1 to 5 and from 0.5 to 5 parts by weight, respectively, per 100 parts of the halogenated elastomer by weight.

18. The composition of claim 17 wherein the halogenated elastomer is brominated.

19. The composition of claim 1 wherein the halogenated elastomer is a halogenated interpolymer of a $C_4$ to $C_7$ isoolefin copolymerized with a para-alkylstyrene, said copolymer containing from about 0.5 to about 20 mole % of monomer units of the following structure randomly distributed therein:

$$-CH_2-CH- \qquad -CH_2-CH-$$

(with phenyl ring bearing $R-\overset{\overset{}{|}}{\underset{R'}{C}}-H$ and $R-\overset{\overset{}{|}}{\underset{R''}{C}}-X$ respectively) and wherein R and R' are independently selected from the group consisting of hydrogen and lower alkyl, R" is independently selected from the group consisting of hydrogen, lower alkyl and X, and X is bromine or chlorine, and wherein the copolymer is substantially free of ring halogen and free of halogen present in the polymer backbone chain.

20. The composition of claim 19 wherein the crosslinking agent is zinc oxide, present in an amount of from 2 to 3 parts by weight, and the accelerator material is a hydrated sodium salt of bis-1,6-hexamethylene thiosulfate, present in an amount of from 1 to 3 parts by weight based on 100 parts of the halogenated elastomer by weight.

21. The composition of claim 20 wherein said halogenated interpolymer is a terpolymer of isobutylene, para-methylstyrene and monobromo-para-methylstyrene.

22. The composition of claim 21 wherein from about 5 to about 60 mole % of the para methylstyrene monomer units contain a mono-bromomethyl group.

23. The composition of claim 22 wherein said terpolymer has a bromine content in the range of from about 0.1 to about 5 mole percent.

24. The composition of claim 3 wherein the diene elastomer is selected from natural or synthetic cis-polyisoprene, polybutadiene, butadiene-styrene copolymers and EPDM rubber.

* * * * *